United States Patent
Yokoyama et al.

US011332803B2

(10) Patent No.: US 11,332,803 B2
(45) Date of Patent: May 17, 2022

(54) HIGH STRENGTH HOT-DIP GALVANIZED STEEL SHEET AND PRODUCTION METHOD THEREFOR

(71) Applicant: NIPPON STEEL CORPORATION, Tokyo (JP)

(72) Inventors: Takafumi Yokoyama, Tokyo (JP); Yuji Yamaguchi, Tokyo (JP); Masahiro Nakata, Tokyo (JP); Kunio Hayashi, Tokyo (JP); Satoshi Uchida, Tokyo (JP); Takuma Kawanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 169 days.

(21) Appl. No.: 16/603,658

(22) PCT Filed: Mar. 22, 2018

(86) PCT No.: PCT/JP2018/011504
§ 371 (c)(1),
(2) Date: Oct. 8, 2019

(87) PCT Pub. No.: WO2018/193787
PCT Pub. Date: Oct. 25, 2018

(65) Prior Publication Data
US 2020/0115771 A1 Apr. 16, 2020

(30) Foreign Application Priority Data
Apr. 21, 2017 (JP) .............................. JP2017-084827

(51) Int. Cl.
*C21D 9/46* (2006.01)
*C21D 6/00* (2006.01)
*C21D 8/02* (2006.01)
*C22C 38/00* (2006.01)
*C22C 38/02* (2006.01)
(Continued)

(52) U.S. Cl.
CPC .............. *C21D 9/46* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/06* (2013.01); *C23C 2/28* (2013.01); *C23C 2/40* (2013.01); *B32B 15/01* (2013.01); *B32B 15/043* (2013.01); *B32B 15/18* (2013.01);
(Continued)

(58) Field of Classification Search
CPC ....... C22C 38/28; C22C 38/002; C22C 38/54; C22C 38/48; C22C 38/50; C22C 38/02; C22C 38/44; C22C 38/06; C22C 38/001; C22C 38/005; C22C 38/04; C22C 38/16; C22C 38/08; C22C 38/12; C22C 38/42; C22C 38/14; C22C 38/58; C22C 38/00; C22C 38/32; C22C 38/18; C22C 38/20; C22C 38/38; C22C 38/40; C22C 38/46; C23C 2/02; C23C 2/06; C23C 2/26; C23C 2/28; C23C 2/40; C23C 2/34; C23C 30/00; C23C 30/005; C21D 2211/001; C21D 2211/004; C21D 2211/005; C21D 2211/008; C21D 2211/009; C21D 9/46; C21D 6/002; C21D 6/005; C21D 6/008; C21D 8/0205; C21D 8/0236; B32B 15/00; B32B 15/01; B32B 15/013; B32B 15/04; B32B 15/043; B32B 15/18; Y10T 428/26; Y10T 428/12799; Y10T 428/12951; Y10T 428/12958; Y10T 428/12972
USPC .......... 148/504; 428/659, 681, 684, 682, 332
See application file for complete search history.

(56) References Cited

U.S. PATENT DOCUMENTS

| 8,828,557 B2* | 9/2014 | Takagi ..................... C23C 2/06 428/659 |
| 8,888,933 B2* | 11/2014 | Hayashi ................... C21D 9/46 148/328 |

(Continued)

FOREIGN PATENT DOCUMENTS

| CN | 103038383 A | 4/2013 |
| EP | 2559782 A1 | 2/2013 |

(Continued)

OTHER PUBLICATIONS

J. Trzaska "Calculation of Critical Temperatures by Empirical Formulae", Arch. Metall. Mater., vol. 61 (2016), No. 2B, p. 981-986 (Year: 2016).*

(Continued)

*Primary Examiner* — Humera N. Sheikh
*Assistant Examiner* — John D Schneible
(74) *Attorney, Agent, or Firm* — Birch, Stewart, Kolasch & Birch, LLP

(57) ABSTRACT

A high-strength hot-dip galvanized steel sheet contains predetermined amounts of C, Si, Mn, P, S, N, O, sol. Al, Ti, and B, 0.1 to 1.5 mass % of Cr+2×Mo, and a balance in a form of Fe and inevitable impurities. A steel structure includes, in area %, ferrite: 1 to 50%, martensite: 20 to 70%, residual austenite: 0 to 5%, pearlite: 0 to 5%, MA and cementite having 0.2 μm or more grain size: 0 to 5% in total, and a balance in a form of bainite. A number density of MA or cementite having 0.2 μm or more grain size and isolated in ferrite or bainite grains is 100 pcs/1000 μm² or less, and an average hardness of martensite is in a range from 330 to 500 Hv.

5 Claims, No Drawings

(51) Int. Cl.
 *C22C 38/04* (2006.01)
 *C22C 38/06* (2006.01)
 *C22C 38/28* (2006.01)
 *C22C 38/32* (2006.01)
 *C23C 2/06* (2006.01)
 *C23C 2/28* (2006.01)
 *C23C 2/40* (2006.01)
 *B32B 15/18* (2006.01)
 *C22C 38/38* (2006.01)
 *C22C 38/16* (2006.01)
 *C22C 38/40* (2006.01)
 *C22C 38/08* (2006.01)
 *C22C 38/20* (2006.01)
 *B32B 15/01* (2006.01)
 *C22C 38/12* (2006.01)
 *B32B 15/04* (2006.01)

(52) U.S. Cl.
 CPC .. *C21D 2211/001* (2013.01); *C21D 2211/005* (2013.01); *C21D 2211/008* (2013.01); *C21D 2211/009* (2013.01); *C22C 38/005* (2013.01); *C22C 38/08* (2013.01); *C22C 38/12* (2013.01); *C22C 38/16* (2013.01); *C22C 38/20* (2013.01); *C22C 38/38* (2013.01); *C22C 38/40* (2013.01); *Y10T 428/12799* (2015.01); *Y10T 428/12951* (2015.01); *Y10T 428/12958* (2015.01)

(56) References Cited

U.S. PATENT DOCUMENTS

| | | |
|---|---|---|
| 2008/0000555 A1 | 1/2008 | Nonaka et al. |
| 2009/0056836 A1 | 3/2009 | Watanabe et al. |
| 2012/0040203 A1 | 2/2012 | Takagi et al. |
| 2013/0153091 A1 | 6/2013 | Fujita et al. |
| 2013/0206288 A1 | 8/2013 | Kaneko et al. |
| 2014/0242416 A1 | 8/2014 | Matsuda et al. |
| 2016/0186282 A1 | 6/2016 | Han et al. |
| 2016/0312329 A1* | 10/2016 | Hasegawa ............... C22C 38/00 |
| 2017/0275726 A1 | 9/2017 | Hasegava et al. |
| 2019/0249282 A1* | 8/2019 | Nakano ................. C22C 38/002 |

FOREIGN PATENT DOCUMENTS

| | | | | |
|---|---|---|---|---|
| EP | 2599887 A1 | 6/2013 | | |
| EP | 3050989 A1 | 8/2016 | | |
| JP | 7-11383 A | 1/1995 | | |
| JP | H-08188847 | * 7/1996 | ............ C22C 38/00 |
| JP | 2616350 B2 | 6/1997 | | |
| JP | 2006-104532 A | 4/2006 | | |
| JP | 2007-262494 A | 10/2007 | | |
| JP | 2010-24497 A | 2/2010 | | |
| JP | 2010-156031 A | 7/2010 | | |
| JP | 2011052295 A | * 3/2011 | ............ C22C 38/00 |
| JP | 2011-195883 A | 10/2011 | | |
| JP | 6323618 B1 | 5/2018 | | |
| KR | 10-2012-0049622 A | 5/2012 | | |
| KR | 10-2012-0127671 A | 11/2012 | | |
| KR | 10-2013-0021460 A | 3/2013 | | |
| TW | I450982 B | 9/2014 | | |
| WO | WO 2013/051238 A1 | 4/2013 | | |
| WO | WO 2016/031165 A1 | 3/2016 | | |

OTHER PUBLICATIONS

International Search Report for PCT/JP2018/011504 dated May 29, 2018.
Notice of Allowance for TW 107110476 dated May 15, 2019.
Written Opinion of the International Searching Authority for PCT/JP2018/011504 (PCT/ISA/237) dated May 29, 2018.
International Preliminary Report on Patentability and English translation of the Written Opinion of the International Searching Authority (Forms PCT/IB/373 and PCT/ISA/237) for International Application No. PCT/JP2018/011504, dated Oct. 22, 2019.

* cited by examiner

HIGH STRENGTH HOT-DIP GALVANIZED STEEL SHEET AND PRODUCTION METHOD THEREFOR

TECHNICAL FIELD

The present invention relates to a high-strength hot-dip galvanized steel sheet and a manufacturing method thereof.

BACKGROUND ART

In view of recent growing demand for improving fuel efficiency of automobiles in order to reduce greenhouse gas as a global warming countermeasure, a reduction in the weight of automobile bodies, while securing collision safety, is desired. Accordingly, the use of high-strength steel sheet has come to be increasingly popular. Especially, there is a growing need for a super-high-strength steel sheet with 980 MPa or more tensile strength in these days. In addition, a high-strength hot-dip galvanized steel sheet with a hot-dip galvanized surface is desired at a part of automobile bodies requiring rust resistance.

Typical steel sheets for automobiles are pressed into the shape of respective components. Accordingly, elongation and hole expandability are required for the steel sheets used for the press forming. However, increase in the strength of steel sheets usually results in deterioration in elongation and hole expandability.

In order to address the above problem, some measures have been proposed. For instance, Patent Literature 1 discloses that both of strength and elongation of a steel sheet are enhanced by forming the steel sheet with a composite metal structure including ferrite (soft structure) and martensite (hard structure). However, the composite structure disclosed in Patent Literature 1 is a combination of soft and hard structures. A composite structure formed of structures with a large difference in hardness is inferior in hole expandability.

Patent Literature 2 discloses a steel sheet formed of a single metal structure of upper bainite or lower bainite, which has hardness between hardness of ferrite and hardness of martensite, thereby reducing difference in hardness between structures to improve strength and hole expandability. However, the upper and lower bainites are formed of dislocation-rich bainitic ferrite and hard cementite, and are thus inferior in elongation.

Patent Literatures 3 to 5 each disclose a high-strength steel sheet with improved elongation and hole expandability with the use of TRIP (TRansformation-Induced Plasticity) of residual austenite. However, carbon amount in steel has to be increased in order to generate the residual austenite, so that weldability is deteriorated.

CITATION LIST

Patent Literature(S)

| | |
|---|---|
| Patent Literature 1 | JP 7-11383 A |
| Patent Literature 2 | Japanese Patent No. 2616350 |
| Patent Literature 3 | International Publication No. WO 2013/51238 |
| Patent Literature 4 | JP 2006-104532 A |
| Patent Literature 5 | JP 2007-262494 A |

SUMMARY OF THE INVENTION

Problem(s) to be Solved by the Invention

As described above, various efforts made heretofore in order to improve the elongation, hole expandability, and bendability of high-strength steel sheets through a variety of technique are not sufficient to simultaneously improve the above properties without impairing practical performance in other respects.

The invention has been made in view of the above current situation. An object of the invention is to provide a high-strength hot-dip galvanized steel sheet excellent in balance between elongation, hole expandability, and bendability and having 980 MPa or more tensile strength, and a manufacturing method of the steel sheet.

Means for Solving the Problem(s)

Aspects of the invention will be exemplarily described as follows.

(1) A high-strength hot-dip galvanized steel sheet having a chemical composition including, in mass %:
C: 0.050% to 0.130%;
Si: 0.010% to 2.00%:
Mn: 1.50% to 3.50%;
P: 0.10% or less;
S: 0.010% or less;
N: 0.010% or less;
O: 0.010% or less;
sol. Al: 0.001% to 1.0%;
Ti: 0.005% to 0.20%;
B: 0.0005% to 0.010%;
Cr+2×Mo: 0.10 to 1.50%; and
a balance comprising Fe and inevitable impurities, in which
a steel structure at a part in a thickness range from one eighth to three eighths around one fourth of a thickness of the steel sheet from a surface of the steel sheet includes, in area %:
ferrite: 1 to 50%;
martensite: 20 to 70%;
residual austenite: 0 to 5%;
pearlite: 0 to 5%;
MA and cementite having 0.2 μm or more grain size in total: 0 to 5%; and
a balance in a form of bainite,
a number density of the MA or cementite having 0.2 un or more grain size and isolated in ferrite or bainite grains is 100 pcs/1000 μm2 or less, and an average hardness of martensite is in a range from 330 Hv to 500 Hv.

(2) The high-strength hot-dip galvanized steel sheet according to the above aspect of the invention, in which the chemical composition includes, in place of a part of Fe, at least one of:
V: 0.001% to 1.00%; and
Nb: 0.001% to 0.200%.

(3) The high-strength hot-dip galvanized steel sheet according to the above aspect of the invention, in which the chemical composition includes, in place of a part of Fe, at least one of:
Ni: 0.001% to 1.00%;
Cu: 0.001% to 1.00%;
Co: 0.001% to 1.00%;
W: 0.001% to 1.00%;
Sn: 0.001% to 1.00%; and
Sb: 0.001% to 0.50%.

(4) The high-strength hot-dip galvanized steel sheet according to the above aspect of the invention, in which the chemical composition includes, in place of a part of Fe, at least one of:

Ca: 0.0001% to 0.0100%;
Mg: 0.0001% to 0.0100%;
Ce: 0.0001% to 0.0100%;
Zr: 0.0001% to 0.0100%;
La: 0.0001% to 0.0100%;
Hf: 0.0001% to 0.0100%;
Bi: 0.0001% to 0.0100%; and
mischmetal: 0.0001% to 0.0100%.

(5) A manufacturing method of the high-strength hot-dip galvanized steel sheet according to another aspect of the invention includes sequential steps of: A) a hot rolling step; B) a cold rolling step; and C) a hot-dip galvanization step, in which in the (A) hot rolling step, (A1) a slab heating temperature is 1150 degrees C. or more, (A2) a total rolling reduction in a temperature region from 1150 to 1050 degrees C. is 50% or more.

(A3) a total rolling reduction in a time period after a time point at which a temperature of the slab falls below 1050 degrees C. and before a final path of a finish rolling is in a range from 66 to 95%, (A4) a rolling reduction in the final path of the finish rolling ranges from 10% to 30%, and a temperature at the final path in the finish rolling ranges from 850 degrees C. to 1000 degrees C. and (A5) a coiling temperature ranges from 450 to 700 degrees C.;

in the (B) cold rolling step, a rolling reduction is in a range from 20% to 80%; and in the (C) hot-dip galvanization step, (C-1) a maximum heating temperature ranges in a temperature region from Ac3−50 degrees C. to Ac3+50 degrees C., and a retained time in the temperature region ranges from 1 second to 500 seconds.

(C-2) a cooling rate in a temperature region from 600 degrees C. to 720 degrees C. is 5 degrees C./sec. or more, (C-3) a dwell time in a temperature region from 480 degrees C. to 600 degrees C. is in a range from 5 to 500 seconds, (C-4) a dwell time in a temperature region from 440 degrees C. to 480 degrees C. is in a range from 5 to 60 seconds, and (C-5) a cooling step to a room temperature after a galvanization and alloying process is performed so that a value represented by a formula (1) below exceeds 30000 and becomes less than 150000 in a temperature region from Ms to 150 degrees C., Formula 1

$$\sum_{T=Ms}^{150} f_M(T) \cdot TP(T) \quad (1)$$

where:
$f_M(T) = 1 - \exp\{-0.011 \times (Ms-T)\}$,
$TP(T) = (T+273) \times \{\mathrm{Log}\, 10(\Delta t/3600)+6\}$,
Ms represents martensite transformation start temperature (degrees C.),
T represents a temperature (degrees C.), and
Δt (second) represents a time required for cooling from T (degrees C.) to T−1 (degrees C.).

The above aspects of the invention provides a high-strength hot-dip galvanized steel sheet excellent in balance between elongation, hole expandability, and bendability and having 980 MPa or more tensile strength, thus being suitable for steel sheet for automobiles.

DESCRIPTION OF EMBODIMENT(S)

The invention relates to a steel sheet having a hot-dip galvanized layer on one or both sides thereof, which is not a steel sheet for hot-dip galvanization before the galvanized layer is provided. Components of the invention will be described below.

Chemical Composition

Initially, why the chemical composition of the high-strength steel sheet (sometimes simply referred to as "steel sheet" hereinafter) of the invention is defined as described above will be described. It should be noted that all "%" in the definition of the chemical composition herein represent "mass %" unless otherwise noted.

C: 0.050% to 0.130%

A content of C (carbon), which is an element requisite for increasing the strength of the steel sheet, is 0.050% or more. Meanwhile, addition of C in excess of 0.130% deteriorates weldability. Accordingly, the content of C is in a range from 0.050% to 0.130%. The content of C is preferably in a range from 0.060% to 0.100%, more preferably in a range from 0.065 to 0.090%.

Si: 0.010% to 2.00%

A content of Si (silicon), which is a solid solution strengthening element and is effective in increasing the strength of the steel sheet, is 0.010% or more. Meanwhile, addition of Si in excess of 2.00% deteriorates wettability of the steel sheet with zinc in hot-dip galvanization. Additionally, Si added in excess of 2.00% increases temper softening resistance of martensite and, consequently, hardness of martensite. Accordingly, the content of Si is in a range from 0.010% to 2.00%, preferably from 0.10% to 1.00%, further preferably from 0.30% to 0.70%.

[Mn: 1.50%~3.50%]

A content of Mn (manganese), which is a strong austenite stabilizing element and is effective in increasing the strength of the steel sheet, is 1.50% or more. Meanwhile, addition of Mn in excess of 3.50% increases a sum of fractions of cementite and MA each with 0.2 μm or more grain size, resulting in deterioration in hole expandability. Accordingly, the content of Mn is in a range from 1.50% to 3.50%, preferably from 2.00% to 3.00%, further preferably from 2.20% to 2.80%.

P: 0.10% or Less

P (phosphorus), which is a solid solution strengthening element contained in the steel as inevitable impurities and is effective in increasing the strength of the steel sheet, deteriorates weldability and toughness when excessively added. Accordingly, the content of P is limited in a range of 0.10% or less, preferably 0.05% or less, further preferably 0.02% or less. However, an excessive reduction in the content of P requires high dephosphorization cost, so that a lower limit of the content of P is preferably 0.001% in terms of economical efficiency.

S: 0.010% or Less

S (sulfur), which is contained in the steel as inevitable impurities, forms MnS in the steel to deteriorate toughness and hole expandability of the steel. Accordingly, the content of S is limited to 0.010% or less, in which the deterioration in toughness and hole expandability are not so prominent. The content of S is preferably 0.006% or less, more preferably to 0.003% or less. However, an excessive reduction in the content of S requires high desulfurization cost, so that a lower limit of the content of S is preferably 0.0005% in terms of economical efficiency.

N: 0.010% or Less

N (nitrogen), which is contained in the steel as inevitable impurities, forms coarse nitride in the steel at a content in excess of 0.010% to deteriorate bendability and hole expandability of the steel. Accordingly, the content of N is limited to be 0.010% or less. The content of N is preferably 0.006% or less, more preferably to 0.003% or less. However, an excessive reduction in the content of N requires high denitrogenation cost, so that a lower limit of the content of N is preferably 0.0005% in terms of economical efficiency.

O: 0.010% or Less

O (oxygen), which is contained in the steel as inevitable impurities, forms coarse oxide in the steel at a content in excess of 0.010% to deteriorate bendability and hole expandability of the steel. Accordingly, the content of O is limited to be 0.010% or less. The content of O is preferably 0.006% or less, more preferably to 0.003% or less. A lower limit of the content of O is preferably 0.0001% in terms of production costs.

sol. Al: 0.001% to 1.0%

At least 0.001%, preferably 0.005% or more Al (aluminum) in terms of sol. Al is added for deoxidation of the steel. However, excessive addition of Al not only results in saturation of effect and useless increase in cost, but also increase in transformation temperature of steel to increase load at the time of hot rolling. Accordingly, the content of sol. Al is 1.0% at the maximum, preferably 0.50% or less, further preferably 0.20% or less. It should be noted that the term "sol. Al" refers to a content of Al solid-dissolved in steel as an alloy component, which does not include Al deposited or dispersed in a form of aluminum compound (e.g. aluminum nitride).

Ti: 0.005% to 0.20%

Ti (titanium) forms TiN to fix N in steel, thereby inhibiting formation of BN that lowers quenching performance. In addition, Ti reduces the grain size of austenite during heating to improve toughness. Accordingly, at least 0.005%, preferably 0.010% Ti is added. Meanwhile, addition of excessive amount of Ti reduces ductility of the steel sheet. Accordingly, the content of Ti is limited to 0.20% at the maximum, preferably 0.050% or less.

B: 0.0005% to 0.010%

B (boron), which is segregated at austenite boundaries or ferrite/austenite boundaries during a heating process of the steel sheet to stabilize the boundaries and enhance the quenching performance of the steel, is an element requisite for the invention in order to ensure desired martensite amount by quenching. In order to sufficiently achieve the above effect, B is necessary to be added at a content of 0.0005% or more, preferably 0.0010% or more. Meanwhile, excessive addition of B results in formation of boride and, consequently, impairs the quenching performance of steel. Accordingly, the content of B is limited to 0.010% at the maximum, preferably 0.0060% or less, further preferably 0.0040% or less.

Cr+2×Mo: 0.10 to 1.50%

Cr and Mo, which both are elements that inhibit bainite transformation, are added in the invention so that Cr+2×Mo is 0.10% or more. When Cr+2×Mo falls below 0.10%, bainite transformation excessively progresses to reduce an amount of tempered martensite. Further, the number density of MA (two-phase structure of martensite and austenite) and cementite, each having 0.2 μm or more grain size and isolated in bainite, increases. Meanwhile, excessively large Cr+2×Mo results in deterioration in weldability and/or cold formability. Accordingly, the upper limit of Cr+2×Mo is 1.50%. The content of Cr+2×Mo is preferably in a range from 0.20% to 1.0%, more preferably in a range from 0.30 to 0.70%. It should be noted that, while Cr+2×Mo should be kept within the above range, the content of each of Cr and Mo may preferably be selected as desired from Cr in a range from 0.001% to 1.00%, and Mo in a range from 0.001% to 1.00% in view of the effect of Cr and/or Mo to an increase in the strength of the steel sheet, costs and the like.

The high-strength cold-rolled steel sheet of the invention has the above chemical composition and the balance consisting of Fe and inevitable impurities. However, the following element(s) may be contained as necessary in place of a part of Fe.

One or Two or More of V: 0.001% to 1.00% and Nb: 0.001% to 0.200%

V (vanadium) and Nb (niobium), which are carbide-forming elements and are effective in increasing the strength of steel sheet, may be added as necessary. However, excessive addition of V and Nb results in saturation of effects and, consequently, useless increase in costs. Accordingly, the contents of V and Nb are in a range from 0.001% to 1.00% and in a range from 0.001% to 0.200%, respectively. The content of V is preferably in a range from 0.01% to 0.200%. The content of Nb is preferably in a range from 0.005% to 0.100%.

One or Two or More of Ni: 0.01% to 1.0%, Cu: 0.001% to 1.0%, Co: 0.001% to 1.0%, W: 0.001% to 1.0%, Sn: 0.01% to 1.0%, and Sb: 0.001% to 0.50%

Ni (nickel), Cu (copper), Co (cobalt), W (tungsten), Sn (stannum), and Sb (antimony), all of which are elements effective for increasing the strength of steel sheet, may be added as necessary. However, excessive addition of these elements results in saturation of effects and, consequently, useless increase in costs. Accordingly, the contents of these elements are Ni: 0.001% to 1.0%, Cu: 0.001% to 1.0%, Co: 0.001% to 1.0%, W: 0.001% to 1.0%, Sn: 0.001% to 1.0%, and Sb: 0.001 to 0.50%. More preferably, the contents are Ni: 0.1% to 0.8%, Cu: 0.1% to 0.5%, Co: 0.1% to 0.5%, W: 0.1% to 0.3%, Sn: 0.05% to 0.2%, and Sb: 0.01 to 0.10%.

One or Two or More of Elements Selected from the Group Consisting of Ca: 0.0001% to 0.0100, Mg: 0.0001% to 0.0100%, Ce: 0.0001% to 0.0100%, Zr: 0.0001% to 0.0100%. La: 0.0001% to 0.0100%. Hf: 0.0001% to 0.0100%, Bi: 0.0001% to 0.0100%, and Mischmetal: 0.0001% to 0.0100%

Ca (calcium), Mg (magnesium), Ce (cerium), Zr (zirconium), La (lanthanum). Hf (hafnium), and mischmetal, which are elements contributing to size reduction and dispersion of inclusion in steel, and Bi (bismuth), which is an element reducing micro-segregation of substitutional alloy element (e.g. Mn and Si) in steel, contribute to improvement in workability of steel sheet, and thus are preferably added as necessary. In order to achieve the effect, it is necessary to add 0.0001% or more of each of these elements. Meanwhile, excessive addition of these elements deteriorates ductility. Accordingly, the content of each of these elements is limited to be 0.0100% at the maximum. It should be noted that mischmetal refers to a mixed alloy of mixed rare earth metals whose main component is lanthanoid metals.

The high-strength cold-rolled steel sheet of the invention includes the above-described elements and the balance consisting of Fe and inevitable impurities. However, element(s) other than the above-described elements may be contained as long as an effect of the invention is not hampered.

"Steel Structure"

Next, the reason of defining the steel structure of the high-strength steel sheet of the invention will be described. It should be noted that the steel structure whose properties are defined herein is a steel structure of a thickness range of one eighth to three eighths of a thickness of a steel sheet from the surface of the steel sheet (i.e. the thickness range around one fourth thickness of the steel sheet from the surface). The "%" for the definition of the steel structure herein all represents "area %" unless otherwise noted.

Ferrite: 1 to 50%

Ferrite, which is a structure excellent in ductility, improves elongation of a steel sheet. On the other hand, excessive addition of ferrite, which is soft in nature, makes it difficult to ensure desired strength. Accordingly, the content of ferrite is in a range from 1% to 50%, preferably from 10% to 40%, further preferably from 15% to 35%.

Martensite: 20 to 70%

The steel sheet of the invention contains 20% to 70% martensite. When martensite is 20% or less, the strength of steel sheet cannot be ensured. Meanwhile, more than 70% martensite deteriorates elongation of steel sheet. The content of martensite is more preferably in a range from 30% to 60%.

It should be noted that "martensite" herein includes both of fresh martensite (non-tempered martensite), and tempered martensite. It should however be noted that martensite is auto-tempered after galvanization and alloying treatment in the invention, as described below. Accordingly, most of the martensite of the invention is virtually martensite that has been tempered at least to some extent.

However, below-described martensite in two-phase structure of martensite and austenite (Martensite-Austenite Constituent) isolated in ferrite or bainite grains are not included in "martensite."

Residual Austenite: 0 to 5%

Residual austenite, which transforms into harder martensite due to transformation-induced plasticity while a steel sheet is deformed, deteriorates hole expandability of the steel sheet. Accordingly, the content of the residual austenite is in a range from 0 to 5%, preferably from 0 to 3%.

Pearlite: 0 to 5%

Pearlite, which is a hard metal structure including coarse cementite, forms an origin of voids during hole expansion to deteriorate hole expandability of the steel sheet. Accordingly, the content of pearlite is set in a range from 0 to 3%.

MA and Cementite Having 0.2 $\mu$m or More Grain Size in Total: 0 to 5%

Cementite and MA (Martensite-Austenite Constituent), which are extremely hard structures, form an origin of breakage when a steel sheet is machined and thus are detrimental to hole expandability. Accordingly, the contents of cementite and MA are preferably as small as possible. Further, cementite and MA are more likely to form the origin of breakage during the machining of the steel sheet with an increase in the grain size of cementite and MA. With a small grain size (specifically, less than 0.2 $\mu$m), cementite and MA do not cause serious effect. Accordingly, the MA and cementite having 0.2 $\mu$m or more grain size are set to be in a range from 0 to 5% in total, preferably in a range from 0 to 3%. On the other hand, the lower limit is not limited. However, the sum of MA and cementite having 0.2 $\mu$m or more grain size is preferably 1% or more in order to improve the strength.

The remaining part of the structure other than the above is bainite. The bainite as the remaining part may be upper bainite, lower bainite, or a two-phase structure of the upper and lower bainite.

Number Density of MA or Cementite Having 0.2 $\mu$m or More Grain Size Isolated in Ferrite or Bainite Grains: 100 pcs/1000 $\mu$m$^2$ or Less MA and cementite, which are extremely hard structures, form an origin of breakage when a steel sheet is machined. Limiting the number density per unit area in addition to area percentage results in reduction in the origin of breakage, so that hole expandability is improvable. In the invention, the number density of MA or cementite having 0.2 $\mu$m or more grain size isolated in ferrite or bainite grains is set to be 100 pcs/1000 $\mu$m$^2$ or less, preferably 50/1000 $\mu$m$^2$ or less, more preferably 20/1000 $\mu$m$^2$ or less.

The phrase "isolated in ferrite or bainite grains" means that the MA or cementite is not in contact with a crystal grain boundary having an orientation difference of 15 degrees or more. Accordingly, MA or cementite only contacting a grain boundary having the orientation difference of less than 15 degrees (e.g. boundary of sub-structure such as lath of bainite) and not contacting a crystal grain boundary having the orientation difference of 15 degrees or more will be referred to as "isolated in grains."

Average Hardness of Martensite: 330 Hv to 500 Hv

In order to improve the hole expandability, it is important to reduce a difference in hardness between martensite (hard structure) and ferrite/bainite (soft structure). Accordingly, an average hardness of martensite in the invention is set to be 500 Hv or less, preferably 450 Hv or less. Meanwhile, when the hardness of martensite is too low, sufficient strength (i.e. tensile strength of 980 MPa or more) cannot be achieved. Accordingly, the average hardness of martensite is 330 Hv or more.

The average hardness of martensite (martensite average hardness) is measured by measuring a hardness of martensite at a part of one-fourth-thick part of a steel sheet using a Vickers hardness tester. The load applied by the Vickers hardness tester is determined so that an impression formed in the Vickers hardness measurement is restricted in a crystal grain of martensite to be measured. Hardnesses of Fifty Martensite Grains are Measured and Averaged to Provide the Average Hardness of Martensite.

The area % of the steel structure in the invention is calculated as follows.

The area % of ferrite, martensite, pearlite, and MA and cementite having 0.2 $\mu$m or more grain size is calculated by: cutting a steel sheet in a rolling direction to expose a cross section; mirror-finishing the cross section; applying Nital solution on the cross section to reveal the steel structure; and taking a secondary electron image using a scanning electron microscope. Regions, in which sub-structures are present within a grain and carbides are deposited with a plurality of variants, are determined to be martensite. Regions in which cementite is deposited in lamellar shape are determined to be pearlite. Regions with low luminance and having no noticeable sub-structure are determined to be ferrite. Regions with high luminance and without sub-structures emerged by etching are determined to be MA or cementite. Area % of each of the regions are calculated through point-counting method to obtain the area % of martensite and pearlite. Total number of lattices measured through the point-counting method is preferably 1000 or more per 1000 $\mu$m$^2$ field area.

Area % of the residual austenite is measured by X-ray diffraction. A surface at one-eighth to three-eighth thick part around one-fourth thick part from a surface of a steel sheet, which is parallel to the sheet surface, is mirror-finished and is subjected to the X-ray diffraction to measure an area ratio of FCC steel that is determined to be the area % of the residual austenite.

Number density of MA or cementite having 0.2 μm or more grain size and isolated in ferrite or bainite grains is measured as follows. Initially, a steel sheet is cut in a rolling direction to expose a cross section, and is mechanically and electrolytically polished to prepare a sample. On the sample, grain-boundaries with crystal orientation difference of 15 degrees or more are drawn by EBSP-OIM (Electron Back Scatter Diffraction Pattern-Orientation Image Microscopy). Subsequently, the same sample is etched with Nital solution and a secondary electron image is taken for the same area as the EBSD-observed area using a scanning electron microscope. Regions with high luminance and without sub-structures emerged by etching in the secondary electron image are determined to be MA or cementite. Then, the secondary electron image and the EBSD grain boundary map are superposed to count the number of MA and cementite not in contact with the grain boundaries and having a grain size of 0.2 μm or more, which is divided by the area of the measurement field to calculate the number density.

In metal material, mechanical properties such as strength and ductility are improved with the reduction in the grain size. Accordingly, the grain size is preferably set at or below a predetermined grain size.

Effective Grain Size: Preferably 5 μm or Less

In order to further enhance the hole expandability, an effective grain size is preferably set at 5 μm or less. It should be noted that the effective grain size refers to a grain size of a region surrounded by grain boundaries having an orientation difference of 15 degrees or more, which is measured as described below.

An average effective grain size is measured by EBSP-OIM method. The crystal grain boundary of steel is defined as high angle grain boundary with a threshold of 15 degrees, which is generally recognized as the crystal grain boundary. The grains are visualized in an image in which grain boundaries with orientation difference of 15 degrees or more are mapped to measure an average grain size of the grains.

"Mechanical Properties"

Tensile Strength of 980 MPa or More

A tensile strength of the high-strength steel sheet of the invention is 980 MPa or more.

Next, the hot-dip galvanized steel sheet and manufacturing method of the alloyed hot-dip galvanized steel sheet according to the invention will be described.

"Manufacturing Conditions During Hot Rolling Step"

Heating Slab to 1150 Degrees C. or More

In order to sufficiently melt borides and carbides, a slab heating temperature is defined as described above. It should be noted that, though the used steel slab is preferably casted by continuous casting process in view of production efficiency, the slab may alternatively be produced by ingot-making method or thin slab casting method. Further, the casted slab may be once cooled to a room temperature or may be directly delivered to a heating furnace without cooling to a room temperature.

In Hot Rolling Step, Total Rolling Reduction at 1150 to 1050 Degrees C.: 50% or More and Total Rolling Reduction after Time Point of Less than 1050 Degrees C. and Before Final Path of Final Rolling: 66 to 95%

The rolling reduction and rolling temperature in a hot rolling step including a coarse rolling step and a finish rolling step are preferably set as described above.

When the total rolling reduction in a temperature region from 1050 degrees C. to 1150 degrees C. is less than 50%, the structure of the hot-rolled steel sheet is likely to become uneven due to insufficient recrystallization during hot-rolling. As a result, Mn segregation zone is likely to become uneven, increasing the MA fraction in the final structure.

When the total rolling reduction in a time period after a time point at which the sheet temperature falls below 1050 degrees C. and before the final path in the finish rolling exceeds 95%, anisotropy in the final steel sheet is likely to become prominent due to a growth of aggregated texture in a hot-rolled steel sheet. Meanwhile, when the total rolling reduction in a time period after a time point at which the sheet temperature falls below 1050 degrees C. and before the final path in the finish rolling falls below 66%, the structure of the hot-rolled steel sheet is likely to be coarsened, resulting in coarsening of the structure of the final steel sheet and deterioration in workability of the final steel sheet.

The 50% or more total rolling reduction in the temperature region from 1150 to 1050 degrees C. may be achieved solely during the coarse rolling step, or may be achieved through both of the coarse rolling step and the finish rolling step. The total rolling reduction in the temperature region from 1150 to 1050 degrees C. is more preferably 60% or more. The total rolling reduction ranging from 66 to 95% in the time period after the time point at which the sheet temperature falls below 1050 degrees C. and before the final path in the finish rolling step may also be achieved only through the finish rolling step when the time point at which the temperature falls below 1050 degrees C. is in the finish rolling step, or, when the time point at which the temperature falls below 1050 degrees C. is in the coarse rolling step, the total rolling reduction ranging from 66 to 95% may be achieved through both of the coarse rolling step and the finish rolling step. The total rolling reduction in the time period after the time point at which the sheet temperature falls below 1050 degrees C. and before the final path in the finish rolling step is more preferably 70% or more.

In the Finish Rolling Step, Rolling Reduction in Final Path in Finish Rolling Ranges from 10% to 30%, Exit Temperature from Final Path in Finish Rolling Ranges from 850 Degrees C. to 1000 Degrees C.

Reduction distribution and rolling temperature in the finish rolling step are preferably set as described above. When the rolling reduction in the final path in the finish rolling exceeds 30% or an exit temperature from the final path in the finish rolling (rolling completion temperature) falls below 850 degrees C., anisotropy in the final steel sheet is likely to become prominent due to a growth of aggregated texture in a hot-rolled steel sheet. Meanwhile, when the rolling reduction in the final path in the finish rolling falls below 10% or the exit temperature from the final path in the finish rolling exceeds 1000 degrees C., the structure of the hot-rolled steel sheet is likely to be coarsened, resulting in coarsening the structure of final steel sheet and deterioration in workability of the final steel sheet.

Coiling Temperature: 450 to 700 Degrees C.

The coiling temperature is set in a range from 450 to 700 degrees C. When the coiling temperature falls below 450 degrees C., the strength of the hot-rolled steel sheet becomes excessively large, impairing cold formability. Meanwhile, when the coiling temperature exceeds 700 degrees C., the amount of martensite in the final product falls below a predetermined amount, making it difficult to achieve a strength for the product.

Hot-rolled coil may be pickled according to a known method. Further, skin pass rolling may be applied in order to correct the shape of the hot-rolled coil and improve pickling capability.

"Manufacturing Conditions During Cold Rolling Step"
Cold Rolling at a Rate Ranging from 20% to 80%

In order to micronize the grain size of austenite being heated in a hot-dip continuous galvanizing line step, a cold rolling rate is preferably 20% or more. Meanwhile, excessive reduction requires a large rolling weight and consequent increase in load applied on a cold-rolling mill. Accordingly, an upper limit of the cold rolling rate is 80%, preferably the cold rolling rate is in a range from 30 to 70%.

After the cold rolling step, the surface of the steel sheet is subjected to hot-dip galvanization (hot-dip continuous galvanizing line step).

"Manufacturing Conditions During Hot-Dip Continuous Galvanizing Line Step" Heating Rate from 600 Degrees C. to Maximum Heating Temperature: 0.2 to 10 Degrees C./Sec.

The heating rate is preferably set as described above. When the heating rate exceeds 10 degrees C./sec., recrystallization of ferrite does not sufficiently progress, so that elongation of the steel sheet is likely to be deteriorated. Meanwhile, when the heating rate falls below 0.2 degrees C./sec., austenite is coarsened at this heating stage, so that the final steel structure is likely to be coarsened. The heating rate is more preferably 0.5 degrees C./sec. or more.

Maximum Heating Temperature: Ac3−50 Degrees C. to Ac3+50 Degrees C., Retained in the Temperature Region for 1 Second or More and 500 Seconds or Less In order to obtain a necessary amount of martensite structure and to progress austenitization to a necessary degree, the maximum heating temperature is set to be Ac3−50 degrees C. or more. Meanwhile, when the heating temperature is excessively raised, ferrite fraction is difficult to be secured. The excessively high heating temperature also deteriorates toughness and applicability of chemical conversion coating due to coarsened austenite grain size, and leads to damage of annealing facilities. Accordingly, an upper limit of the heating temperature is set to be Ac3+50 degrees C., preferably in a range from Ac3−30 degrees C. to Ac3. With a short heating time, austenitization does not sufficiently progress to a necessary degree. Accordingly, the heating time is at least 1 second or more, preferably 30 seconds or more. Meanwhile, since excessively long heating time hampers productivity, the upper limit of the heating time is set at 500 seconds.

Cooling Temperature Region: 480 to 600 Degrees C., Cooling Rate in Temperature Region from 720 Degrees C. to 600 Degrees C.: 5 Degrees C./Sec. or More After the above heating process, the steel sheet is cooled to a temperature between 480 to 600 degrees C. A cooling rate in a temperature region from 720 degrees C. to 600 degrees C. is 5 degrees C./sec. or more. When the cooling rate is less than 5 degrees C./sec., the ferrite fraction exceeds the upper limit defined in the invention. The cooling rate is preferably 10 degrees C./sec. or more. Though the upper limit of the cooling rate is not necessarily defined, with a cooling capability of a typical continuous annealing furnace, it is difficult to increase the cooling rate over 100 degrees C./sec.

Dwell Time in Temperature Region from 480 Degrees C. to 600 Degrees C.: 5 to 500 Seconds After the steel sheet is cooled to the above cooling temperature region, the steel sheet is retained in a temperature region from 480 degrees C. to 600 degrees C. for 5 seconds or more. This process inhibits the progress of later-described bainite transformation that inevitably occurs in a temperature region of about 440 to 480 degrees C. in a hot-dip galvanization line. Though the mechanism is not known in detail, it is believed that the progress of the bainite transformation in the temperature region from 440 to 480 degrees C. is inhibited because B atoms in the steel are more segregated in the crystal grain boundaries while the steel sheet is retained in the temperature region from 480 degrees C. to 600 degrees C. Since bainite is generated during the hot-dip galvanization line, the number density of MA or cementite having 0.2 μm or more grain size and isolated in ferrite or bainite grains reaches 100 pcs/1000 μm$^2$ or more in the end. The dwell time is preferably 10 seconds or more, more preferably 30 seconds or more. Meanwhile, too long dwell time causes pearlite transformation. Accordingly, the dwell time is set to be 500 seconds or less, preferably 300 seconds or less. It should be noted that the steel sheet may be retained at a constant temperature or may be retained in a changing temperature (e.g. gradually cooling in the temperature region from 480 degrees C. to 600 degrees C.) as long as the defined conditions are satisfied.

Dwell Time in Temperature Region from 440 Degrees C. to 480 Degrees C.: 5 to 60 Seconds In order to galvanize the steel sheet, the steel sheet is cooled to a temperature region from 440 to 480 degrees C. after the above process. The dwell time in the temperature region from 440 degrees C. to 480 degrees C. is 60 seconds or less. In the temperature region, the bainite transformation rapidly progresses. Accordingly, when the dwell time in the temperature region is long, the bainite transformation excessively progresses, thus failing to achieve the martensite fraction required in the invention. Further, the bainite grains generated in the temperature region contains more number of MA and cementite as compared with bainite generated in the temperature region from 480 degrees C. to 600 degrees C. Accordingly, the dwell time in the temperature region is preferably as short as possible. However, since the steel sheet has to be dipped in a molten zinc bath in the hot-dip galvanization line, the dwell time in the temperature region is inevitably present. Accordingly, the lower limit of the dwell time in the temperature region from 440 degrees C. to 480 degrees C. is set at 5 seconds.

After the steel sheet is retained in the temperature region from 440 degrees C. to 480 degrees C. for 5 to 60 seconds, the hot-dip galvanization may be performed in accordance with a known method. For instance, the temperature of the galvanizing bath is in a range from 440 to 480 degrees C., and dipping time is 5 seconds or less. The galvanizing bath preferably contains 0.08 to 0.2% Al, and optionally contains Fe, Si, Mg, Mn, Cr, Ti, and Pb as inevitable impurities. Coating weight of the galvanization is preferably controlled by a known method such as gas wiping process. The coating weight is preferably 25 to 75 g/m$^2$ per one surface.

The high-strength hot-dip galvanized steel sheet with the hot-dip galvanization layer may be subjected to an alloying process as necessary. In this case, when the alloying temperature is less than 460 degrees C., the alloying rate is so slow that productivity is impaired and the sheet may be unevenly alloyed. Accordingly, the alloying temperature is preferably 460 degrees C. or more. Meanwhile, when the alloying temperature exceeds 600 degrees C., the area ratio of pearlite in the hot-dip galvanized steel sheet exceeds 5%. Accordingly, the alloying temperature is preferably 600 degrees C. or less, more preferably 580 degrees C. or less.

Dwell Time in Temperature Region from 150 Degrees C. to Ms

After the galvanization and alloying process, the steel sheet is cooled so that a value represented by a formula (1)

below exceeds 30000 and becomes less than 150000 in a temperature region from Ms to 150 degrees C.

Formula 1

$$\sum_{T=Ms}^{150} f_M(T) \cdot TP(T) \quad (1)$$

where:
$f_M(T) = 1 - \exp\{-0.011 \times (Ms-T)\}$
$TP(T) = (T+273) \times \{\text{Log } 10(\Delta t/3600) + 6\}$ Ms represents a start temperature of martensite transformation, T represents temperature (degrees C.), and Δt represents time (second) required to be cooled from T(degrees C.) to T−1 (degrees C.). In the invention, the martensite transformation occurs during a cooling process after the galvanization and alloying process. Further, martensite is auto-tempered so that martensite is softened. The formula (1) represents a parameter indicating a degree of progress in auto-tempering of martensite. The larger the value represented by the formula (1) is, the more the martensite is auto-tempered and thus softened. Meanwhile, the smaller the value represented by the formula (1) is, the less the martensite is auto-tempered, and the more the martensite is hardened. In order to achieve the average hardness of martensite ranging from 330 Hv to 500 Hv, it is necessary that the cooling process is performed under conditions satisfying the formula (1).

$f_M(T)$ in the formula (1) represents martensite transformation rate at T degrees C. The smaller T becomes (i.e. the larger the degree of supercooling from Ms is), the larger $f_M(T)$ becomes. TP(T) is a parameter representing how far the martensite is tempered at T degrees C. TP(T) becomes larger with an increase in T. TP(T) also becomes larger as the dwell time Δt at T degrees C. prolongs. Further, the higher Ms of the steel sheet is, the larger the value represented by the formula (1) becomes.

The cooling pattern from Ms to 150 degrees C. may assume any form as long as the formula (1) is satisfied. For instance, the steel sheet may be linearly cooled at a constant cooling rate from Ms to a room temperature, or, alternatively, the cooling rate may be changed during the cooling process. Further alternatively, the steel sheet may be retained at a predetermined temperature.

It should be noted that the martensite transformation in the invention occurs after the ferrite transformation and bainite transformation. C is distributed to austenite in accordance with the ferrite transformation and bainite transformation. Accordingly, Ms of the austenite is not the same as Ms when a single phase of austenite is heated and quenched. Ms in the invention can be determined by: using, for instance, a thermal dilatometer (e.g. Formastor tester), applying a heat treatment simulating a heat cycle of the hot-dip galvanization line (e.g. heating temperature, heating rate, heating time, cooling rate, cooling temperature range, cooling dwell time, heating temperature equal to the galvanization bath temperature, heating time equal to the galvanization time, and cooling condition after galvanization until starting martensite transformation); and measuring thermal expansion temperature in the cooling process.

After the hot-dip continuous galvanizing line step, a temper rolling may be applied on the steel sheet in order to correct flatness of the steel sheet and adjust surface roughness of the steel sheet. In this case, in order to avoid deterioration in ductility, elongation rate is preferably 2% or less.

Example(s)

Next, Examples of the invention will be described below. The conditions in Examples are determined in order to demonstrate the applicability and effects of the invention and thus are exemplary. The invention is not limited by the conditions for Examples below. Various conditions are applicable to the invention as long as the conditions are not contradictory to the gist of the invention and are compatible with an object of the invention.

Pieces of steel having the chemical compositions shown in Table 1 were melted to produce slabs. The slabs were each subjected to a hot-rolling under the conditions shown in Table 2 to prepare hot-rolled steel sheets. Subsequently, the hot-rolled steel sheets were pickled to remove scales on the surface thereof. Then, the steel sheets were subjected to cold rolling under the conditions shown in Table 2. Further, the produced steel sheets were subjected to heat treatment and continuous hot-dip galvanization under the conditions shown in Table 3.

TABLE 1

| | C | Si | Mn | P | S | Al | N | O | Cr | Mo | Nb | Ti | B | Others | Cr + 2 × Mo |
|---|---|---|---|---|---|---|---|---|---|---|---|---|---|---|---|
| A | 0.085 | 0.53 | 2.44 | 0.009 | 0.0012 | 0.029 | 0.0043 | 0.0017 | 0.20 | 0.09 | 0.016 | 0.037 | 0.0021 | | 0.38 |
| B | 0.119 | 0.24 | 2.16 | 0.011 | 0.0013 | 0.026 | 0.0053 | 0.0019 | 0.43 | 0.08 | 0.021 | 0.029 | 0.0018 | | 0.59 |
| C | 0.087 | 0.89 | 2.52 | 0.014 | 0.0022 | 0.021 | 0.0030 | 0.0020 | | 0.15 | 0.019 | 0.031 | 0.0030 | | 0.30 |
| D | 0.070 | 0.33 | 3.21 | 0.014 | 0.0039 | 0.035 | 0.0037 | 0.0016 | 0.03 | 0.07 | 0.011 | 0.035 | 0.0013 | | 0.17 |
| E | 0.075 | 0.90 | 2.73 | 0.015 | 0.0019 | 0.022 | 0.0036 | 0.0010 | 0.04 | 0.04 | 0.024 | 0.021 | 0.0027 | | 0.12 |
| F | 0.077 | 0.58 | 2.59 | 0.006 | 0.0024 | 0.020 | 0.0042 | 0.0016 | 0.35 | 0.08 | 0.010 | 0.018 | 0.0006 | | 0.51 |
| G | 0.073 | 0.42 | 2.57 | 0.012 | 0.0028 | 0.025 | 0.0038 | 0.0008 | 0.92 | 0.28 | 0.015 | 0.025 | 0.0020 | | 1.48 |
| H | 0.069 | 1.57 | 2.29 | 0.014 | 0.0040 | 0.029 | 0.0056 | 0.0018 | | 0.14 | 0.019 | 0.027 | 0.0024 | | 0.28 |
| I | 0.067 | 1.91 | 2.06 | 0.010 | 0.0028 | 0.012 | 0.0040 | 0.0005 | 0.25 | 0.06 | 0.010 | 0.019 | 0.0016 | | 0.37 |
| J | 0.083 | 0.65 | 1.91 | 0.011 | 0.0026 | 0.016 | 0.0023 | 0.0018 | 0.71 | | 0.022 | 0.021 | 0.0016 | | 0.71 |
| K | 0.091 | 0.37 | 2.80 | 0.007 | 0.0033 | 0.240 | 0.0041 | 0.0018 | 0.10 | 0.13 | 0.010 | 0.036 | 0.0020 | | 0.38 |
| L | 0.076 | 0.70 | 2.63 | 0.008 | 0.0016 | 0.018 | 0.0048 | 0.0012 | 0.05 | 0.31 | | 0.026 | 0.0025 | | 0.67 |
| M | 0.094 | 1.13 | 1.58 | 0.014 | 0.0020 | 0.020 | 0.0045 | 0.0020 | 0.16 | 0.20 | 0.007 | 0.033 | 0.0022 | | 0.56 |
| N | 0.083 | 0.42 | 2.55 | 0.010 | 0.0010 | 0.023 | 0.0059 | 0.0017 | 0.17 | 0.06 | 0.015 | 0.023 | 0.0019 | V: 0.13, W: 0.2 | 0.29 |
| O | 0.098 | 0.92 | 2.00 | 0.011 | 0.0013 | 0.035 | 0.0056 | 0.0019 | 0.31 | 0.10 | | 0.038 | 0.0020 | Co: 0.45 | 0.51 |
| P | 0.072 | 0.66 | 2.75 | 0.011 | 0.0013 | 0.035 | 0.0056 | 0.0019 | 0.06 | 0.08 | | 0.038 | 0.0028 | Cu: 0.43, Ni: 0.55 | 0.22 |
| Q | 0.080 | 0.59 | 2.61 | 0.007 | 0.0039 | 0.019 | 0.0049 | 0.0019 | 0.17 | 0.022 | 0.027 | 0.0015 | Sn: 0.12, Sb: 0.05 | 0.34 |
| R | 0.073 | 0.50 | 2.47 | 0.009 | 0.0026 | 0.021 | 0.0028 | 0.0011 | 0.41 | 0.08 | 0.019 | 0.026 | 0.0023 | Ca: 0.0038, Mg: 0.0027 | 0.57 |
| S | 0.081 | 0.40 | 2.89 | 0.007 | 0.0031 | 0.016 | 0.0031 | 0.0012 | | 0.21 | 0.024 | 0.030 | 0.0017 | Ce: 0.0050 | 0.42 |
| T | 0.086 | 0.46 | 2.59 | 0.015 | 0.0013 | 0.024 | 0.0035 | 0.0019 | | 0.28 | 0.024 | 0.025 | 0.0026 | La: 0.0063, Hf: 0.0059 | 0.56 |
| U | 0.124 | 0.21 | 2.14 | 0.016 | 0.0022 | 0.026 | 0.0030 | 0.0019 | | 0.16 | 0.012 | 0.025 | 0.0021 | Bi: 0.0046 | 0.32 |

TABLE 1-continued

| | C | Si | Mn | P | S | Al | N | O | Cr | Mo | Nb | Ti | B | Others | Cr + 2 × Mo |
|---|---|---|---|---|---|---|---|---|---|---|---|---|---|---|---|
| V | 0.067 | 0.67 | 2.06 | 0.013 | 0.0018 | 0.023 | 0.0043 | 0.0020 | 0.53 | 0.12 | 0.017 | 0.029 | 0.0015 | REM: 0.0071 | 0.77 |
| W | 0.168 | 0.34 | 2.30 | 0.008 | 0.0021 | 0.030 | 0.0028 | 0.0010 | 0.05 | 0.07 | 0.019 | 0.030 | 0.0021 | | 0.19 |
| X | 0.086 | 0.45 | 2.59 | 0.011 | 0.0022 | 0.031 | 0.0054 | 0.0015 | 0.22 | 0.17 | 0.008 | 0.037 | 0.0002 | | 0.56 |
| Y | 0.098 | 0.81 | 2.69 | 0.016 | 0.0016 | 0.025 | 0.0038 | 0.0012 | 0.03 | 0.02 | 0.013 | 0.022 | 0.0019 | | 0.07 |
| Z | 0.070 | 0.19 | 4.24 | 0.012 | 0.0010 | 0.024 | 0.0046 | 0.0020 | 0.26 | 0.07 | 0.015 | 0.026 | 0.0017 | | 0.40 |
| AA | 0.082 | 0.43 | 2.30 | 0.008 | 0.0034 | 0.019 | 0.0036 | 0.0019 | 0.91 | 0.79 | 0.024 | 0.022 | 0.0017 | | 2.49 |
| AB | 0.092 | 2.12 | 2.09 | 0.012 | 0.0020 | 0.025 | 0.0038 | 0.0005 | 0.16 | 0.07 | 0.020 | 0.020 | 0.0018 | | 0.30 |

Bold face indicates that the value is out of the scope of the invention

TABLE 2

| | | | Hot Rolling | | | | | Cold Rolling |
|---|---|---|---|---|---|---|---|---|
| Ex. No. | Type | Chem. Composition | Slab heating temp. °C. | Total rolling reduction from 1150 to 1050° C. % | Total rolling reduction from 1050 before final path % | Rolling reduction in finishing final path % | Rolling completion temp. °C. | winding temp. °C. | Cold rolling rate % |
| 1 | Inventive | A | 1230 | 85 | 91 | 15 | 940 | 580 | 52 |
| 2 | Inventive | A | 1230 | 85 | 91 | 15 | 950 | 570 | 52 |
| 3 | Inventive | A | 1240 | 85 | 91 | 15 | 950 | 580 | 52 |
| 4 | Inventive | A | 1230 | 85 | 91 | 15 | 940 | 560 | 52 |
| 5 | Inventive | A | 1240 | 85 | 91 | 15 | 940 | 570 | 52 |
| 6 | Inventive | A | 1250 | 85 | 91 | 15 | 930 | 580 | 52 |
| 7 | Inventive | A | 1230 | 85 | 91 | 15 | 950 | 570 | 52 |
| 8 | Inventive | A | 1240 | 93 | 66 | 17 | 960 | 580 | 60 |
| 9 | Inventive | A | 1220 | 50 | 92 | 20 | 940 | 550 | 56 |
| 10 | Comp. | A | 1240 | 85 | 91 | 15 | 950 | 560 | 52 |
| 11 | Comp. | A | 1250 | 85 | 91 | 15 | 930 | 580 | 52 |
| 12 | Comp. | A | 1250 | 85 | 91 | 15 | 930 | 580 | 52 |
| 13 | Comp. | A | 1240 | 85 | 91 | 15 | 940 | 720* | 52 |
| 14 | Comp. | A | 1230 | 85 | 91 | 15 | 940 | 580 | 52 |
| 15 | Inventive | A | 1250 | 85 | 91 | 15 | 930 | 570 | 52 |
| 16 | Comp. | A | 1230 | 85 | 91 | 15 | 960 | 550 | 52 |
| 17 | Inventive | A | 1220 | 85 | 91 | 15 | 930 | 580 | 52 |
| 18 | Inventive | A | 1240 | 85 | 91 | 15 | 950 | 590 | 52 |
| 19 | Comp. | A | 1230 | 85 | 91 | 15 | 930 | 560 | 52 |
| 20 | Comp. | A | 1260 | 85 | 91 | 15 | 980 | 560 | 52 |
| 21 | Comp. | A | 1260 | 85 | 91 | 15 | 980 | 560 | 52 |
| 22 | Inventive | A | 1230 | 85 | 91 | 15 | 940 | 590 | 52 |
| 23 | Inventive | A | 1240 | 85 | 91 | 15 | 940 | 550 | 52 |
| 24 | Inventive | B | 1250 | 85 | 91 | 15 | 940 | 560 | 52 |
| 25 | Inventive | C | 1260 | 85 | 91 | 15 | 960 | 580 | 52 |
| 26 | Inventive | D | 1230 | 85 | 91 | 15 | 920 | 560 | 52 |
| 27 | Inventive | E | 1250 | 85 | 91 | 15 | 950 | 570 | 52 |
| 28 | Inventive | F | 1250 | 85 | 91 | 15 | 930 | 540 | 52 |
| 29 | Inventive | G | 1240 | 85 | 91 | 15 | 970 | 590 | 52 |
| 30 | Inventive | H | 1250 | 85 | 91 | 15 | 960 | 580 | 52 |
| 31 | Inventive | I | 1260 | 85 | 91 | 15 | 970 | 600 | 52 |
| 32 | Inventive | J | 1260 | 85 | 91 | 15 | 940 | 570 | 52 |
| 33 | Inventive | K | 1230 | 85 | 91 | 15 | 920 | 520 | 52 |
| 34 | Inventive | L | 1250 | 85 | 91 | 15 | 950 | 590 | 52 |
| 35 | Inventive | M | 1260 | 85 | 91 | 15 | 920 | 560 | 52 |
| 36 | Inventive | N | 1250 | 85 | 91 | 15 | 970 | 560 | 52 |
| 37 | Inventive | O | 1230 | 85 | 91 | 15 | 920 | 550 | 52 |
| 38 | Inventive | P | 1220 | 85 | 91 | 15 | 920 | 570 | 52 |
| 39 | Inventive | Q | 1260 | 85 | 91 | 15 | 940 | 520 | 52 |
| 40 | Inventive | R | 1220 | 85 | 91 | 15 | 940 | 570 | 52 |
| 41 | Inventive | S | 1260 | 85 | 91 | 15 | 930 | 580 | 52 |
| 42 | Inventive | T | 1250 | 85 | 91 | 15 | 940 | 600 | 52 |
| 43 | Inventive | U | 1220 | 85 | 91 | 15 | 970 | 530 | 52 |
| 44 | Inventive | V | 1240 | 85 | 91 | 15 | 920 | 540 | 52 |
| 45 | Comp. | W | 1250 | 85 | 91 | 15 | 970 | 520 | 52 |
| 46 | Comp. | X | 1240 | 85 | 91 | 15 | 960 | 580 | 52 |
| 47 | Comp. | Y | 1230 | 85 | 91 | 15 | 940 | 570 | 52 |
| 48 | Comp. | Z | 1260 | 85 | 91 | 15 | 910 | 600 | 52 |
| 49 | Comp. | AA | 1230 | 85 | 91 | 15 | 920 | 600 | 52 |
| 50 | Comp. | AB | 1250 | 85 | 91 | 15 | 940 | 560 | 52 |
| 51 | Inventive | A | 1230 | 85 | 91 | 15 | 960 | 600 | 52 |
| 52 | Inventive | A | 1250 | 85 | 91 | 15 | 950 | 550 | 52 |

Bold face indicates that the value is out of the scope of the invention
*indicates values outside the manufacturing conditions of the invention.

TABLE 3

| | | | Heat treatment | | | | | | | Hot-dip galvanization | | |
|---|---|---|---|---|---|---|---|---|---|---|---|---|
| No. | Type | Chem. Composition | Heating rate from 600° C. to max. heating temp. ° C./sec | Max. heating temp. ° C. | $A_{c3}$ ° C. | Max. heating temp. − Ac3 ° C. | Retaining time at max. heating temp. sec | Cooling rate from 720° C. to 600° C. ° C./sec | Dwell time from 480 to 600° C. sec | Dwell time from 440 to 480° C. sec | Alloying temperature ° C. | Formula (1)/1000 | Ms ° C. |
| 1 | Inventive | A | 1.8 | 800 | 821 | −21 | 90 | 35 | 35 | 18 | 530 | 92 | 330 |
| 2 | Inventive | A | 1.8 | 840 | 821 | 19 | 90 | 35 | 35 | 18 | 520 | 101 | 333 |
| 3 | Inventive | A | 1.8 | 810 | 821 | −11 | 90 | 35 | 15 | 18 | 510 | 56 | 279 |
| 4 | Inventive | A | 1.8 | 800 | 821 | −21 | 90 | 35 | 35 | 40 | 580 | 56 | 289 |
| 5 | Inventive | A | 1.8 | 800 | 821 | −21 | 90 | 35 | 35 | 18 | 550 | 39 | 329 |
| 6 | Inventive | A | 1.8 | 800 | 821 | −21 | 90 | 35 | 35 | 18 | 570 | 136 | 342 |
| 7 | Inventive | A | 1.8 | 805 | 821 | −16 | 90 | 35 | 120 | 18 | 520 | 104 | 350 |
| 8 | Inventive | A | 1.8 | 800 | 821 | −21 | 90 | 35 | 35 | 18 | 550 | 97 | 341 |
| 9 | Inventive | A | 1.8 | 795 | 821 | −26 | 90 | 35 | 35 | 18 | 540 | 98 | 343 |
| 10 | Comp. | A | 1.8 | 805 | 821 | −16 | 90 | 35 | 35 | 18 | 520 | 168* | 337 |
| 11 | Comp. | A | 1.8 | 810 | 821 | −11 | 90 | 35 | 3* | 18 | 510 | 43 | 265 |
| 12 | Comp. | A | 1.8 | 830 | 821 | 9 | 90 | 35 | 35 | 74* | 570 | 36 | 239 |
| 13 | Comp. | A | 1.8 | 830 | 821 | 9 | 90 | 35 | 35 | 18 | 570 | 45 | 259 |
| 14 | Comp. | A | 1.8 | 800 | 821 | −21 | 90 | 35 | 35 | 18 | 520 | 26* | 325 |
| 15 | Inventive | A | 1.8 | 800 | 821 | −21 | 90 | 35 | 35 | 18 | 520 | 84 | 320 |
| 16 | Comp. | A | 1.8 | 800 | 821 | −21 | 90 | 35 | 35 | 18 | 620* | 82 | 318 |
| 17 | Inventive | A | 1.8 | 790 | 821 | −31 | 90 | 35 | 35 | 18 | 600 | 86 | 323 |
| 18 | Inventive | A | 0.2 | 800 | 821 | −21 | 90 | 35 | 35 | 18 | 550 | 87 | 330 |
| 19 | Comp. | A | 1.8 | 900* | 821 | 79* | 90 | 35 | 35 | 18 | 580 | 107 | 353 |
| 20 | Comp. | A | 1.8 | 800 | 821 | −21 | 90 | 3* | 35 | 18 | 560 | 70 | 308 |
| 21 | Comp. | A | 1.8 | 800 | 821 | −21 | 90 | 3* | 35 | 18 | 560 | 49 | 308 |
| 22 | Inventive | A | 1.8 | 775 | 821 | −46 | 90 | 35 | 35 | 18 | 540 | 68 | 321 |
| 23 | Inventive | A | 1.8 | 795 | 821 | −26 | 90 | 35 | 35 | 18 | N/A | 97 | 332 |
| 24 | Inventive | B | 1.8 | 790 | 803 | −13 | 90 | 35 | 35 | 18 | 550 | 78 | 307 |
| 25 | Inventive | C | 1.8 | 820 | 838 | −18 | 90 | 35 | 35 | 18 | 540 | 70 | 297 |
| 26 | Inventive | D | 1.8 | 785 | 801 | −16 | 90 | 35 | 35 | 18 | 520 | 83 | 313 |
| 27 | Inventive | E | 1.8 | 815 | 834 | −19 | 90 | 35 | 35 | 18 | 530 | 83 | 276 |
| 28 | Inventive | F | 1.8 | 800 | 814 | −14 | 90 | 35 | 35 | 18 | 550 | 96 | 297 |
| 29 | Inventive | G | 1.8 | 790 | 815 | −25 | 90 | 35 | 35 | 18 | 560 | 114 | 381 |
| 30 | Inventive | H | 1.8 | 850 | 885 | −35 | 90 | 35 | 35 | 18 | 510 | 110 | 342 |
| 31 | Inventive | I | 1.8 | 880 | 893 | −13 | 90 | 35 | 35 | 18 | 580 | 93 | 359 |
| 32 | Inventive | J | 1.8 | 830 | 831 | −1 | 90 | 35 | 35 | 18 | 590 | 81 | 316 |
| 33 | Inventive | K | 1.8 | 860 | 886 | −26 | 90 | 35 | 35 | 18 | 560 | 77 | 311 |
| 34 | Inventive | L | 1.8 | 810 | 829 | −19 | 90 | 35 | 35 | 18 | 570 | 90 | 327 |
| 35 | Inventive | M | 1.8 | 870 | 875 | −5 | 90 | 35 | 35 | 18 | 510 | 115 | 355 |
| 36 | Inventive | N | 1.8 | 800 | 825 | −25 | 90 | 35 | 35 | 18 | 510 | 79 | 314 |
| 37 | Inventive | O | 1.8 | 830 | 850 | −20 | 90 | 35 | 35 | 18 | 510 | 92 | 330 |
| 38 | Inventive | P | 1.8 | 790 | 810 | −20 | 90 | 35 | 35 | 18 | 510 | 89 | 326 |
| 39 | Inventive | Q | 1.8 | 800 | 820 | −20 | 90 | 35 | 35 | 18 | 540 | 86 | 323 |
| 40 | Inventive | R | 1.8 | 800 | 817 | −17 | 90 | 35 | 35 | 18 | 590 | 89 | 326 |
| 41 | Inventive | S | 1.8 | 790 | 802 | −12 | 90 | 35 | 35 | 18 | 510 | 61 | 291 |
| 42 | Inventive | T | 1.8 | 810 | 823 | −13 | 90 | 35 | 35 | 18 | 540 | 52 | 279 |
| 43 | Inventive | U | 1.8 | 810 | 811 | −1 | 90 | 35 | 35 | 18 | 530 | 36 | 254 |
| 44 | Inventive | V | 1.8 | 825 | 843 | −18 | 90 | 35 | 35 | 18 | 510 | 117 | 357 |
| 45 | Comp. | W | 1.8 | 780 | 794 | −14 | 90 | 35 | 35 | 18 | 590 | 36 | 250 |
| 46 | Comp. | X | 1.8 | 810 | 817 | −7 | 90 | 35 | 35 | 18 | 580 | 31 | 232 |
| 47 | Comp. | Y | 1.8 | 810 | 827 | −17 | 90 | 35 | 35 | 18 | 560 | 34 | 236 |
| 48 | Comp. | Z | 1.8 | 760 | 756 | 4 | 90 | 35 | 35 | 18 | 540 | 63 | 288 |
| 49 | Comp. | AA | 1.8 | 810 | 831 | −21 | 90 | 35 | 35 | 18 | 540 | 117 | 349 |
| 50 | Comp. | AB | 1.8 | 875 | 900 | −25 | 90 | 35 | 35 | 18 | 580 | 91 | 344 |
| 51 | Inventive | A | 12.0 | 805 | 821 | −16 | 90 | 35 | 35 | 18 | 550 | 92 | 330 |
| 52 | Inventive | A | 0.07 | 800 | 821 | −21 | 90 | 35 | 35 | 18 | 520 | 98 | 330 |

Ac3 (° C.) = 911 − 203 × [C]0.5 − 15.2 × [Ni] + 44.7 × [Si] + 104 × [V] + 31.5 × [Mo] − 30 × [Mn] − 11 × [Cr] − 20 × [Cu] + 700 × [P] + 400 × [Al].
where values in brackets represent mass % of each of elements.
Bold face indicates that the value is out of the scooe of the invention
*indicates values outside the manufacturing conditions of the invention.

JIS No. 5 tensile test specimen was taken from the thus obtained steel sheets in a direction orthogonal to the rolling direction. The structure of the specimen was analyzed, and a tensile test according to JIS Z2241 was performed on the specimen to measure a tensile strength (TS) and total elongation (El). Further, "JFS T 1001 Method of hole expanding test" according to the Japan Iron and Steel Federation was performed to measure a hole expandability (λ). Specimens having 980 MPa or more tensile strength, 10% or more elongation, and 30% or more hole expandability were evaluated "good" in terms of mechanical properties. Table 4 shows the results. It should be noted that the minute MA and cementite of less than 0.2 μm, which are contained in grains of bainite or martensite and are difficult to separately measure, are counted in the number of bainite or martensite.

TABLE 4

| No. | Type | Ferrite % | Residual γ % | martensite % | Average hardness of martensite HV | pearlite % | θ + MA of 0.2 μm or more % | bainite % | Average grain size μm | Number density of θ, MA pcs/ 1000 um² | TS MPa | El % | Hole expandability λ % |
|---|---|---|---|---|---|---|---|---|---|---|---|---|---|
| 1 | Inventive | 28 | 1 | 42 | 397 | 0 | 1 | 28 | 4.5 | 9 | 1034 | 16.8 | 61 |
| 2 | Inventive | 4 | 1 | 44 | 366 | 0 | 2 | 49 | 3.5 | 18 | 1074 | 10.6 | 65 |
| 3 | Inventive | 20 | 1 | 24 | 410 | 0 | 2 | 53 | 3.8 | 53 | 986 | 15.9 | 37 |
| 4 | Inventive | 24 | 1 | 26 | 416 | 0 | 2 | 47 | 4.1 | 27 | 993 | 16.7 | 43 |
| 5 | Inventive | 25 | 0 | 42 | 468 | 0 | 1 | 32 | 3.9 | 11 | 1144 | 15.8 | 43 |
| 6 | Inventive | 30 | 2 | 50 | 357 | 0 | 1 | 17 | 3.5 | 10 | 1003 | 17.1 | 63 |
| 7 | Inventive | 29 | 1 | 59 | 370 | 0 | 1 | 10 | 4.4 | 7 | 1058 | 16.0 | 63 |
| 8 | Inventive | 24 | 1 | 50 | 391 | 0 | 1 | 24 | 7.2 | 12 | 1074 | 15.3 | 43 |
| 9 | Inventive | 25 | 2 | 51 | 402 | 0 | 5 | 17 | 4.3 | 11 | 1126 | 15.5 | 42 |
| 10 | Comp. | 24 | 1 | 47 | 318 | 0 | 1 | 27 | 4.2 | 8 | 940* | 15.5 | 67 |
| 11 | Comp. | 20 | 1 | 22 | 445 | 0 | 3 | 54 | 4.1 | 105 | 1006 | 16.0 | 16* |
| 12 | Comp. | 10 | 0 | 15 | 408 | 0 | 3 | 72 | 4.4 | 118 | 967* | 13.6 | 28* |
| 13 | Comp. | 12 | 0 | 16 | 400 | 0 | 2 | 70 | 3.5 | 18 | 956* | 14.1 | 58 |
| 14 | Comp. | 27 | 0 | 40 | 518 | 0 | 1 | 32 | 3.8 | 12 | 1190 | 16.4 | 21* |
| 15 | Inventive | 25 | 1 | 37 | 395 | 0 | 1 | 36 | 4.1 | 11 | 1015 | 16.4 | 59 |
| 16 | Comp. | 22 | 1 | 36 | 418 | 7 | 1 | 33 | 4.1 | 11 | 986 | 15.3 | 21* |
| 17 | Inventive | 28 | 0 | 39 | 415 | 4 | 1 | 28 | 4.3 | 14 | 1001 | 16.5 | 31 |
| 18 | Inventive | 21 | 0 | 43 | 394 | 0 | 1 | 35 | 8.0 | 12 | 1049 | 14.8 | 40 |
| 19 | Comp. | 0 | 1 | 62 | 350 | 0 | 2 | 35 | 6.7 | 16 | 1120 | 8.5* | 59 |
| 20 | Comp. | 60 | 0 | 33 | 429 | 0 | 0 | 7 | 4.6 | 0 | 918* | 21.2 | 40 |
| 21 | Comp. | 61 | 1 | 34 | 475 | 0 | 0 | 4 | 4.3 | 0 | 982 | 21.6 | 26* |
| 22 | Inventive | 49 | 1 | 37 | 440 | 0 | 2 | 11 | 4.5 | 15 | 1008 | 18.3 | 33 |
| 23 | Inventive | 31 | 0 | 44 | 381 | 0 | 1 | 24 | 4.0 | 13 | 1004 | 17.2 | 55 |
| 24 | Inventive | 18 | 1 | 42 | 460 | 0 | 2 | 37 | 3.9 | 15 | 1159 | 14.3 | 43 |
| 25 | Inventive | 22 | 2 | 28 | 399 | 0 | 1 | 47 | 3.9 | 32 | 991 | 16.4 | 44 |
| 26 | Inventive | 16 | 1 | 40 | 468 | 0 | 2 | 41 | 4.4 | 18 | 1165 | 13.9 | 39 |
| 27 | Inventive | 21 | 1 | 22 | 435 | 0 | 1 | 55 | 3.7 | 53 | 986 | 16.3 | 31 |
| 28 | Inventive | 17 | 2 | 27 | 370 | 0 | 2 | 52 | 4.2 | 87 | 980 | 15.2 | 33 |
| 29 | Inventive | 20 | 0 | 69 | 376 | 0 | 2 | 9 | 4.3 | 9 | 1139 | 10.8 | 68 |
| 30 | Inventive | 34 | 2 | 34 | 425 | 0 | 3 | 27 | 4.0 | 16 | 1028 | 18.9 | 32 |
| 31 | Inventive | 13 | 3 | 40 | 476 | 0 | 2 | 42 | 4.1 | 13 | 1197 | 13.6 | 30 |
| 32 | Inventive | 12 | 0 | 31 | 377 | 0 | 1 | 56 | 4.3 | 23 | 1001 | 13.2 | 58 |
| 33 | Inventive | 35 | 1 | 38 | 408 | 0 | 1 | 25 | 3.7 | 11 | 1006 | 18.8 | 52 |
| 34 | Inventive | 21 | 0 | 40 | 370 | 0 | 1 | 38 | 3.5 | 8 | 1001 | 14.9 | 68 |
| 35 | Inventive | 34 | 1 | 41 | 396 | 0 | 1 | 23 | 3.9 | 22 | 1008 | 18.4 | 44 |
| 36 | Inventive | 28 | 0 | 38 | 402 | 0 | 1 | 33 | 4.2 | 13 | 1013 | 16.8 | 54 |
| 37 | Inventive | 23 | 0 | 41 | 406 | 0 | 1 | 35 | 4.4 | 10 | 1050 | 15.4 | 63 |
| 38 | Inventive | 16 | 1 | 48 | 382 | 0 | 1 | 34 | 3.7 | 9 | 1074 | 13.4 | 69 |
| 39 | Inventive | 26 | 0 | 38 | 379 | 0 | 1 | 35 | 3.5 | 6 | 992 | 16.3 | 65 |
| 40 | Inventive | 26 | 0 | 38 | 390 | 0 | 1 | 35 | 3.6 | 8 | 1003 | 16.3 | 70 |
| 41 | Inventive | 19 | 0 | 30 | 411 | 0 | 1 | 50 | 4.1 | 17 | 1013 | 15.0 | 62 |
| 42 | Inventive | 20 | 0 | 26 | 401 | 0 | 2 | 52 | 3.8 | 33 | 983 | 15.5 | 51 |
| 43 | Inventive | 9 | 1 | 22 | 436 | 0 | 2 | 66 | 3.5 | 21 | 1031 | 13.2 | 53 |
| 44 | Inventive | 24 | 0 | 46 | 362 | 0 | 1 | 29 | 3.6 | 7 | 1004 | 15.3 | 72 |
| 45 | Comp. | 21 | 1 | 37 | 520 | 0 | 2 | 39 | 4.2 | 18 | 1194 | 15.3 | 17* |
| 46 | Comp. | 23 | 1 | 12 | 408 | 0 | 2 | 62 | 3.8 | 129 | 912* | 17.4 | 18* |
| 47 | Comp. | 18 | 0 | 14 | 404 | 0 | 1 | 67 | 3.5 | 67 | 922* | 15.8 | 36 |
| 48 | Comp. | 4 | 3 | 57 | 475 | 0 | 7 | 29 | 4.1 | 33 | 1377 | 10.1 | 23* |
| 49 | Comp. | 15 | 0 | 75 | 396 | 0 | 2 | 8 | 3.9 | 8 | 1232 | 8.2* | 44 |
| 50 | Comp. | 31 | 2 | 44 | 511 | 0 | 1 | 22 | 4.8 | 7 | 1216 | 14.7 | 26* |
| 51 | Inventive | 33 | 1 | 40 | 399 | 0 | 1 | 25 | 4.3 | 15 | 1034 | 10.6 | 51 |
| 52 | Inventive | 35 | 1 | 40 | 391 | 0 | 2 | 22 | 10.2 | 16 | 1057 | 14.2 | 30 |

Bold face indicates that the value is out of the scope of the invention
*indicates values not reaching predetermined property value.
θ in the Table represents cementite.

In Experiment 10, the value represented by the formula (1) exceeds the range required by the invention. Consequently, the hardness of martensite is lowered, so that the strength falls below 980 MPa.

In Experiment 14, the value represented by the formula (1) exceeds the range required by the invention. Consequently, the hardness of martensite is increased, so that the hole expandability is deteriorated.

In Experiment 11, the dwell time in the temperature region from 480 to 600 degrees C. falls below the range required by the invention. Consequently, the number density of MA or cementite having 0.2 μm or more grain size and isolated in ferrite or bainite grains is increased, so that the hole expandability is deteriorated.

In Experiment 12, the dwell time in the temperature region from 440 to 480 degrees C. falls below the range required by the invention. Consequently, the area % of martensite falls below the definition of the invention, the strength falls below 980 MPa, and the number density of MA or cementite having 0.2 μm or more grain size and isolated in ferrite or bainite grains is increased, so that the hole expandability is deteriorated.

In Experiment 13, the coiling temperature exceeds the range required by the invention. Consequently, the area % of martensite falls below the range required by the invention, so that the strength falls below 980 MPa.

In Experiment 16, the alloying temperature exceeds the range required by the invention. Consequently, pearlite exceeding the definition of the invention is generated, so that the hole expandability is deteriorated.

In Experiment 19, the maximum heating temperature exceeds the range required by the invention. Consequently, the area % of ferrite is decreased, so that the elongation is deteriorated.

In Experiments 20 and 21, the cooling rate in the temperature region from 720 to 600 degrees C. falls below the range required by the invention. Consequently, the area % of ferrite is increased, so that the strength or the hole expandability is deteriorated.

In Experiments 45 to 50, the chemical compositions are out of the definition of the invention.

In Experiment 45, the content of C exceeds the range required by the invention, so that the hardness of martensite is increased to deteriorate the hole expandability.

In Experiment 46, the content of B falls below the range required by the invention, so that martensite fraction is decreased to deteriorate the tensile strength.

In Experiment 47, Cr+2×Mo falls below the range required by the invention, so that martensite fraction is decreased to deteriorate the tensile strength.

In Experiment 49, Cr+2×Mo exceeds the range required by the invention, so that martensite fraction is increased to deteriorate the elongation.

In Experiment 48, the content of Mn exceeds the range required by the invention, so that the fraction of cementite and MA in total is increased to deteriorate the hole expandability.

In Experiment 50, the content of Si exceeds the range required by the invention, so that the hardness of martensite is increased to deteriorate the hole expandability.

In contrast, the chemical composition and manufacturing conditions in Experiments 1 to 9, 15, 17, 18, 22 to 44, 51, and 52 are within the range required by the invention, so that the structure as defined by the invention and, consequently, excellent mechanical properties are obtained.

The invention claimed is:

1. A high-strength hot-dip galvanized steel sheet having a chemical composition comprising, in mass %:
C: 0.050% to 0.130%;
Si: 0.010% to 2.00%;
Mn: 1.50% to 3.50%;
P: 0.10% or less;
S: 0.010% or less;
N: 0.010% or less;
O: 0.010% or less;
sol. Al: 0.001% to 1.0%;
Ti: 0.005% to 0.20%;
B: 0.0005% to 0.010%;
Cr+2×Mo: 0.10 to 1.50%; and
a balance comprising Fe and inevitable impurities, wherein
a steel structure at a part in a thickness range from one eighth to three eighths of a thickness of the steel sheet from a surface of the steel sheet comprises, in area %:
ferrite: 1 to 49%;
tempered martensite: 20 to 70%;
residual austenite: 0 to 5%;
pearlite: 0 to 5%;
MA and cementite having 0.2 μm or more grain size in total: 0 to 5%, wherein MA is a two-phase structure of martensite and austenite; and
a balance in a form of bainite,
a number density of the MA or cementite having 0.2 μm or more grain size and isolated in ferrite or bainite grains is 100 grains of MA or cementite per 1000 μm$^2$ or less,
an average hardness of tempered martensite is in a range from 330 Hv to 500 Hv,
and wherein a tensile strength of the steel sheet is 980 MPa or more.

2. The high-strength hot-dip galvanized steel sheet according to claim 1, wherein the chemical composition comprises, in place of a part of Fe, at least one of:
V: 0.001% to 1.00%; and
Nb: 0.001% to 0.200%.

3. The high-strength hot-dip galvanized steel sheet according to claim 1, wherein the chemical composition comprises, in place of a part of Fe, at least one of:
Ni: 0.001% to 1.00%;
Cu: 0.001% to 1.00%;
Co: 0.001% to 1.00%;
W: 0.001% to 1.00%;
Sn: 0.001% to 1.00%; and
Sb: 0.001% to 0.50%.

4. The high-strength hot-dip galvanized steel sheet according to claim 1, wherein the chemical composition comprises, in place of a part of Fe, at least one of:
Ca: 0.0001% to 0.0100%;
Mg: 0.0001% to 0.0100%;
Ce: 0.0001% to 0.0100%;
Zr: 0.0001% to 0.0100%;
La: 0.0001% to 0.0100%;
Hf: 0.0001% to 0.0100%;
Bi: 0.0001% to 0.0100%; and
mischmetal, independent of and in addition to said 0.0001% to 0.0100% of Ce and said 0.0001% to 0.0100% of La: 0.0001% to 0.0100%.

5. A manufacturing method of the high-strength hot-dip galvanized steel sheet according to claim 1, the method comprising sequential steps of:
(A) a hot rolling step;
(B) a cold rolling step; and
(C) a hot-dip galvanization step, wherein:
in the (A) hot rolling step, (A1) a slab heating temperature is 1150 degrees C. or more,
(A2) a total rolling reduction in a temperature region from 1150 degrees C. to 1050 degrees C. is 50% or more,
(A3) a total rolling reduction in a time period after a time point at which a temperature of the slab falls below 1050 degrees C. and before a final path of a finish rolling is in a range from 66 to 95%,
(A4) a rolling reduction in the final path of the finish rolling ranges from 10% to 30%, and a temperature at the final path in the finish rolling ranges from 850 degrees C. to 1000 degrees C., and
(A5) a coiling temperature ranges from 450 degrees C. to 700 degrees C.;
in the (B) cold rolling step, a rolling reduction is in a range from 20% to 80%; and
in the (C) hot-dip galvanization step, (C-1) a maximum heating temperature ranges in a temperature region from Ac3−50 degrees C. to Ac3+50 degrees C., and a retained time in the temperature region ranges from 1 second to 500 seconds,
(C-2) a cooling rate in a temperature region from 600 degrees C. to 720 degrees C. is 5 degrees C./sec. or more,
(C-3) a dwell time in a temperature region from 480 degrees C. to 600 degrees C. is in a range from 5 to 500 seconds,
(C-4) a dwell time in a temperature region from 440 degrees C. to 480 degrees C. is in a range from 5 to 60 seconds, and
(C-5) a cooling step to a room temperature after a galvanization and alloying process is performed so that a value represented by a formula (1) below exceeds 30000 and becomes less than 150000 in a temperature region from Ms to 150 degrees C., $$\sum_{T=Ms}^{150} f_M(T) \cdot TP(T) \quad (1)$$

where:
$f_M(T) = 1 - \exp\{-0.011 \times (Ms-T)\}$,
$TP(T) = (T+273) \times \{\text{Log } 10(\Delta t/3600) + 6\}$,
Ms represents martensite transformation start temperature (degrees C.),
T represents a temperature (degrees C.), and
Δt (second) represents a time required for cooling from T (degrees C.) to T−1 (degrees C.).

* * * * *